United States Patent Office  3,128,589
Patented Apr. 14, 1964

3,128,589
DEVICES FOR LATERALLY DISPLACING GRASS, HAY OR OTHER MATERIAL LYING ON THE GROUND
Cornelis van der Lely, Zug, and Ary van der Lely, Maasland, Netherlands, assignors to C. van der Lely N.V., Maasland, Netherlands, a Dutch company
Original application Jan. 26, 1955, Ser. No. 484,165, now Patent No. 2,939,265, dated June 7, 1960. Divided and this application June 7, 1960, Ser. No. 34,565
Claims priority, application Netherlands Jan. 29, 1954
17 Claims. (Cl. 56—377)

This invention relates to devices for laterally displacing grass, hay or other material lying on the ground.

This application is a division of application Serial No. 484,165, filed January 26, 1955, and now Patent No. 2,939,265.

Devices of the above-noted type may, for example, include a frame with a rotatable raking mechanism constituted by a number of raking beams adapted to move in constant attitude. These beams may be provided with teeth or other material catching members and may be coupled to rotatable supports.

Known devices of this kind have the drawback that when operating on uneven terrain they are likely to be damaged or to leave deposits of material at sunken places in the terrain.

According to the invention, the above-noted teeth are mounted for turning about axes, there being torsion bar means adapted to be torsionally stressed when the teeth are turned about said axes. Thereby can be provided a device of the above-mentioned kind which will operate satisfactorily and with practically no losses on uneven terrain.

Further objects, features and details of the present invention will appear from the following description with reference to the accompanying drawing in which some embodiments of the device according to the invention have been illustrated by way of example and in which:

FIGURE 3 shows on an enlarged scale also a part of the same device in side elevation, but viewed in the direction of the arrow III in FIGURE 1;

Figure 1:
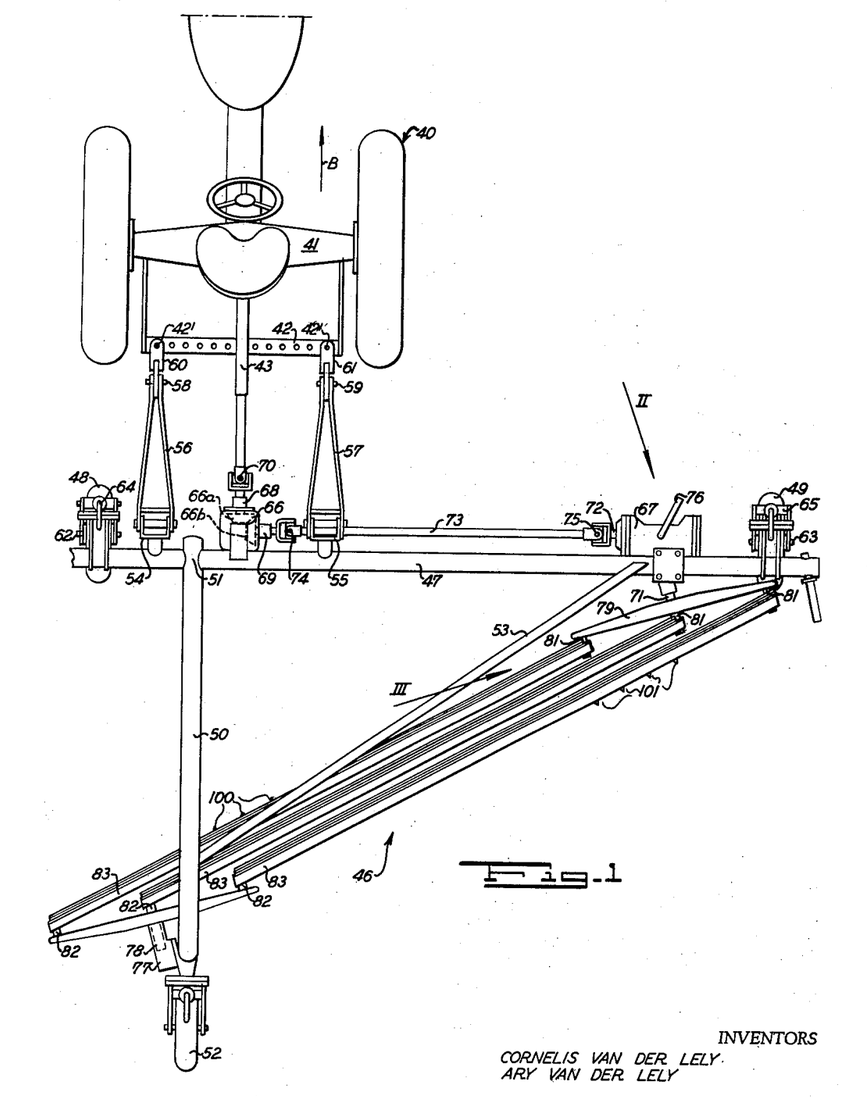
FIGURE 1 is a plan view of a first embodiment.
Figure 2:
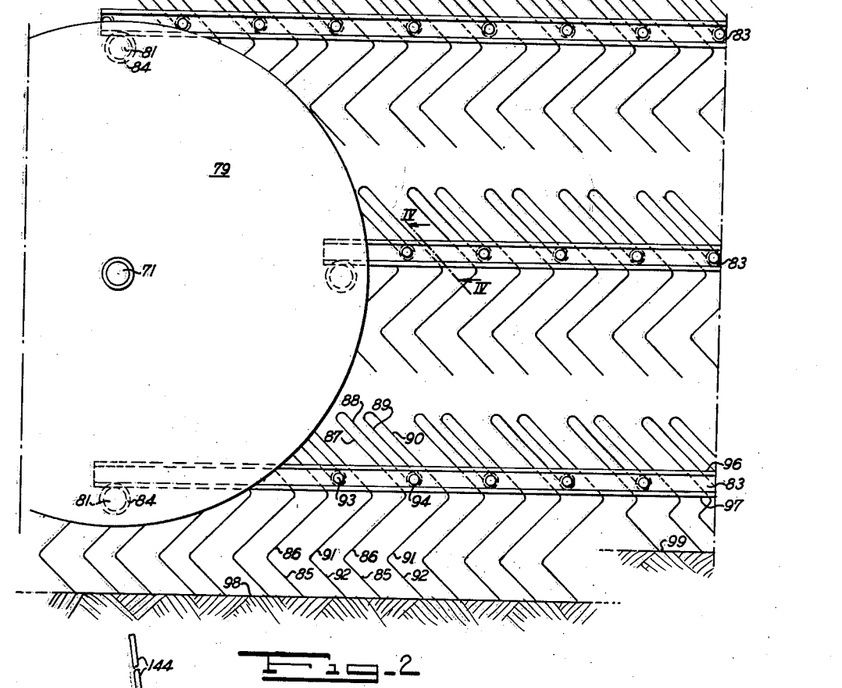
FIGURE 2 shows an enlarged side elevation of a part of the device according to FIGURE 1, viewed in the direction of the arrow II in FIGURE 1.

Referring to FIGURES 1 and 2 of the drawings, the invention has been applied to a raking device of the type having parallel bars mounted on rotors, said raking device being drawn by a tractor and driven by the motor thereof.

The tractor 40 shown in FIGURE 1, has fixed to the rear axle stay 41 a horizontal bar 42 to which various agricultural implements may be fastened and said tractor is further provided with a telescopic shaft 43 that can be driven by the motor of the tractor through a universal joint. In the present case a raking device 46 of the type having parallel bars mounted on rotors is fixed to the bar 42. The frame of said rake 46 comprises a horizontal girder 47, which is sustained by two running wheels 48 and 49 and is at right angles to the direction of travel, and a bar 50 the foremost end of which is rigidly secured to the girder 47 at a point 51 near the running wheel 48, whereas the rear end of said bar 50 is supported by a running wheel 52 and is connected by a strut 53 to a point of the girder 47 near the running wheel 49, by which the foremost end of the bar 50 is relieved from bending moments situated in a horizontal plane. At the left hand side and right hand side respectively of the point 51, hinges 54 and 55 are fixed to the girder 47. The axes of said hinges 54 and 55 are arranged in alignment and have the same direction as the girder 47. Forwardly extending arms 56 and 57 hingedly connected to the girder 47 by means of the hinges 54 and 55, respectively, have their foremost ends connected to U-shaped fastening members 60 and 61 through hinges 58 and 59 with aligned axes extending in the same direction as the girder 47. The fastening members 60 and 61 the limbs of which are provided with openings are connected to the bar 42 by means of pins 42' passing through said openings and corresponding holes provided in the bar 42. The arms 56 and 57 prevent any movement of the girder 47 in horizontal direction at right angles to the direction of travel of the device, which has been indicated by the arrow B; however, they permit vertical movements of the girder 47 in relation to the tractor 40.

The running wheels 48 and 49 are self-adjusting, since the horizontal axles 62 and 63 of these running wheels are respectively connected to vertical axles 64 and 65, respectively, situated in front of the axles 62 and 63 and freely rotatable in bearings fixedly connected to the girder 47. The running wheel 52 is self-adjusting as well. Detail construction of self-adjusting running wheels are well known in the art, and reference is made to U.S. Patents 2,840,977 and 2,836,953 for specific examples of such wheels.

Figure 10:
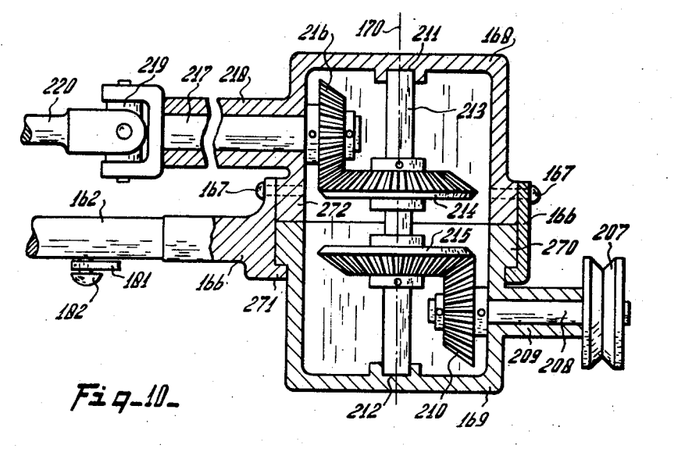
FIGURE 10 is a section of a larger scale of a detail of the device taken on line X—X of FIG. 8.

On the front face of the girder 47 are fixed two gear boxes 66 and 67. The gear box 66 comprises two conical gear wheels 66a and 66b coupling together two shafts 68 and 69 extending from said box and arranged at right angles to each other. The shaft 68 is coupled through a universal joint 70 with the telescopic shaft 43. The gear box 67 couples shaft 71 to a shaft 72. The gear box 67 is of conventional design incorporating conical gears, a similar construction of which is shown in FIG. 10. The shafts 69 and 72 are substantially in alignment and are connected together by an intermediate shaft 73 and two universal joints 74 and 75. The gear box 67 is further provided with an actuating member 76 which may be placed in three positions. In a middle position the shafts 71 and 72 are disengaged from each other. In the extreme positions the shafts are respectively coupled to each other in such a manner that the shaft 71, rotates respectively in clockwise and in counterclockwise directions. The shaft 71 is horizontal and forms an angle of about 15° with the direction of travel, said shaft extending obliquely to the left in a forward direction. At the rear end of the bar 50 a bearing 77 for a shaft 78 parallel to the shaft 71 is provided at the same elevation above the ground as the bearing of the shaft 71. The rear end of the shaft 71 carries a disk shaped wheel 79, whereas the forward end of the shaft 78 carries a disk shaped wheel 80.

The disk 79 carries on its rear face four pins 81 arranged at the corners of a square, whereas the disk 80 is provided on its front face with four pins 82 arranged in a similar manner. All said pins extend in the same direction as the shaft 71. The pins 81 and 82 are respectively located at the same distance from the shafts 71 and 78, respectively, the distance between a pin 81 and a shaft 71 being equal to the distance between a pin 82 and the shaft 78. On each pin 81 and a corresponding pin 82 an angle bar 83 (see also FIGS. 2 and 3) is journalled by means of bushings 84 provided at the ends of the bar and serving as bearings therefor. The angle bars 83 are provided with means for engaging the material lying on the ground in a manner which will be hereinafter described and said bars are referred to as roller-bars or beams. Correspondingly the disk shaped wheels 79 and 80 are referred to as beam carrying supports. For all the beams 83 the distance between the center of a bushing 84 arranged upon a pin 81 and the center of a bushing 84 arranged upon a pin 82 is the same. When the shaft 71 together with the beam carrying support 79 are rotating, the beams 83 will cause the shaft 78 together with the beam carrying support 80 to rotate synchronously therewith. During this movement each point of each of the beams 83 describes a circle with a radius which is equal to the distance between a pin 81 and the shaft 71. It will be understood that the bar 50, which at its point 51 is about the same level above the ground as the shaft 71, has at its rear portion such a distance from the ground that the support 80 and the corresponding extremities of the beams 83 are free to perform their revolving movements.

Each beam 83 is provided with a plurality of means for engaging the material lying on the ground. Said means are constituted by lengths of steel wire bent in the shape of a plane figure comprising a number of straight parts 85–92 (see FIGS. 2, 3 and 4). All said parts are connected to each other by bends of a suitable curvature. Between the parts 85 and 86, 86 and 87, 90 and 91, 91 and 92 the angle is respectively 90°, the parts 85–86–87 and 90–91–92 being bent in zigzag form. The parts 87, 88, 89, 90 are interconnected by semi-circular bends the middlemost of which is rigidly secured to the angle bar 83 by means of a bolt 93 passing through a hole in the bar 83, a thin steel ring 94 and a hole in a strip 95, whereby the parts or teeth 85 and 92 form an angle of about 45° with a horizontal plane; the face of the angle bar 83 against which the steel wire being clamped is vertical.

Figure 4:
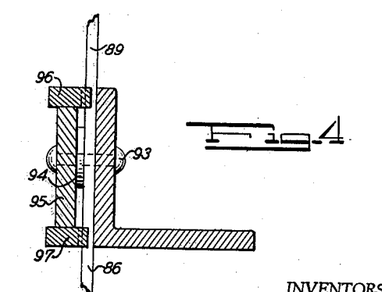
FIGURE 4 is a section of a part of a raking bar on a larger scale taken on the line IV—IV in FIGURE 2.

Due to the ring 94 the parts 87 and 90 of the steel wire, which are located beyond said ring, are not clamped against the bar 83. However, the freedom of movement of said parts 87 and 90 is substantially limited to a rotation about their own axis in the following manner. To the narrow edges of each strip 95, narrow strips 96 and 97 are welded so as to extend in a direction towards the angle bar 83. In each strip 96 there are provided four recesses near every bolt 93, so as to form bearings in which the parts 87, 88, 89 and 90 of a steel wire fit with some clearance, whereas each strip 97 is provided with two recesses near every bolt 93 forming corresponding bearings for the parts 87 and 90. Between the strips 96 and 97 do not extend so far that they would be pressed and the angle bar 83 is provided space so that the ring 94 and the bend between the parts 88 and 89 of the steel wire can be clamped between the strip 96 and the angle bar 83.

The described construction of the crop-engaging means is such that one may consider the parts 85 and 92 as raking teeth, and the parts 86 and 91 as supporting members for said teeth. The parts 87 and 90 afford axes of rotation for said supporting members. Moreover, the parts 87 and 90 and the parts 88 and 89 will function as torsion bars which, due to their elastic deformation upon deflection of the teeth, tend to restore the supporting members to their original positions.

The operation of the device is as follows: When the tractor 40 moves forward and the shaft 43 is rotated by the motor of the tractor, the actuating member 76 is placed in such position that the beam carrying support 79 rotates in a clockwise direction when viewed in the direction of travel. In this case the beams 83 will also revolve in clockwise direction. Although the number of beams is small, no rakable material can remain on the ground if the beams are moving thereover, since by the special mode of fastening of the teeth, permitting each tooth to deflect considerably in a vertical sense, said teeth will move for a great distance over the ground while being in contact therewith. One could also say that the points of the teeth do not describe a complete circle (as they would do, if they were not in contact with the ground), but only a part, e.g. three quarters of a circle situated in a vertical plane. After contacting the ground the points of the teeth deviate from said vertical plane and follow a line situated substantially in a horizontal plane.

In FIG. 2, the reference numeral 98 designates the position of the ground with regard to the raking member in the hypothetical case where the teeth 85 and 92 are only in contact with the ground at one point in their path of motion. In this relative position there would be obtained an insufficient raking action. In FIGS. 2 and 3 the reference numeral 99 designates the position of the ground in relation to the raking member in the case where a good raking action is obtained. By the rotation of the supporting member, such as 91 in FIG. 3, about the axis of rotation, such as 90 in FIG. 3, the tooth, such as 92 in FIG. 3 can yield in a vertical direction without danger of permanent deformation. Upon deflection, the tooth remains in a position which is very favorable for a good raking action. It will be understood that no difficulties whatever will arise when the teeth encounter unevennesses of the ground.

For laterally displacing material which has already been accumulated to a certain height, it will be advantageous to provide the front face of each beam 83 with a plurality of simple crop-engaging means, e.g. in the shape of triangular extensions 100 (see FIG. 1). The triangular extensions 100 merely extend a small distance from the beams 83 and contact and move material by virtue of the movement of beams 83.

When the actuating member 76 is placed in its other extreme position, and the device is drawn forward by the tractor 40 the device will perform no raking action, but it will displace all encountered material to the right by a short distance whereby said material is stirred. An operation of this kind is generally called "tedding." The arrangement and fixation of the teeth to the beams are such that during this reversed movement the teeth can deflect to the other side and consequently adapt themselves considerably in height, while also in this case the teeth can yield in a vertical as well as in a horizontal direction. Fixed crop-engaging means 101 will perform in this case a function corresponding to the action of the crop-engaging means 100.

Figures 4, 5:
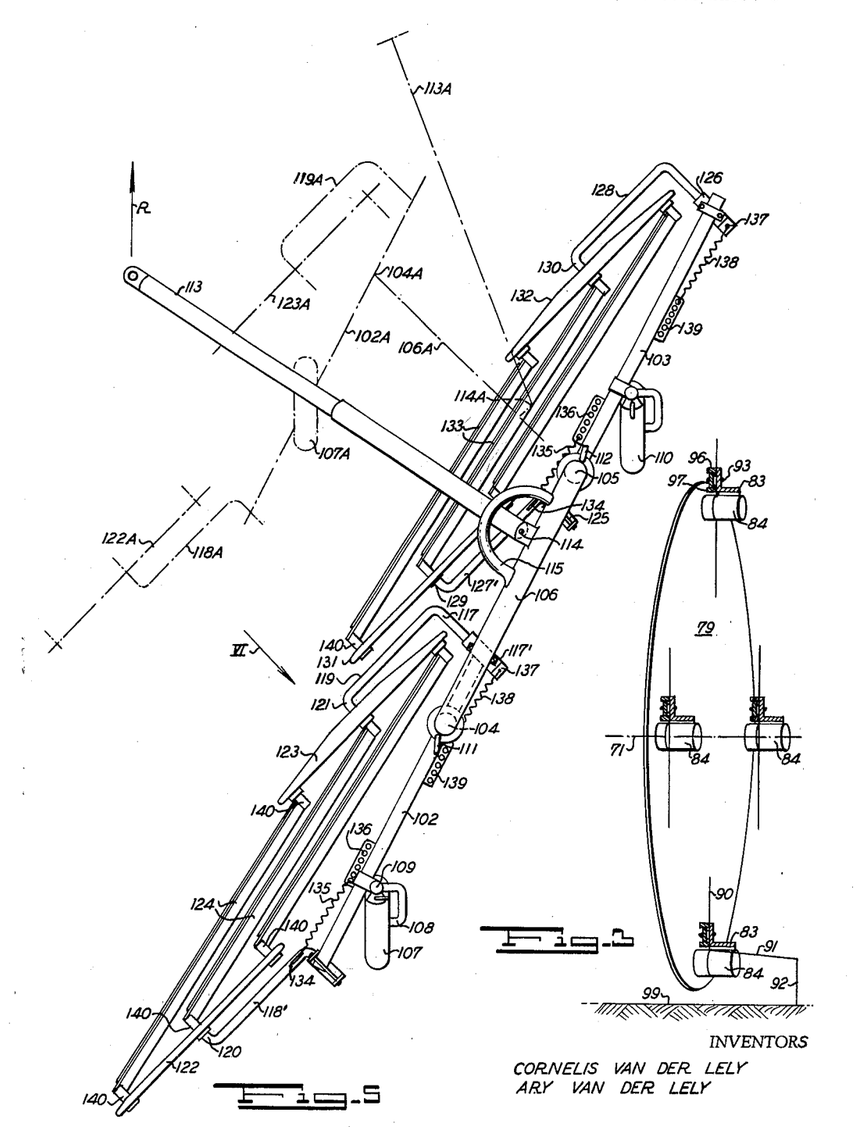
FIGURE 5 is a plan view of a second embodiment of the device according to the invention.
Figure 6:
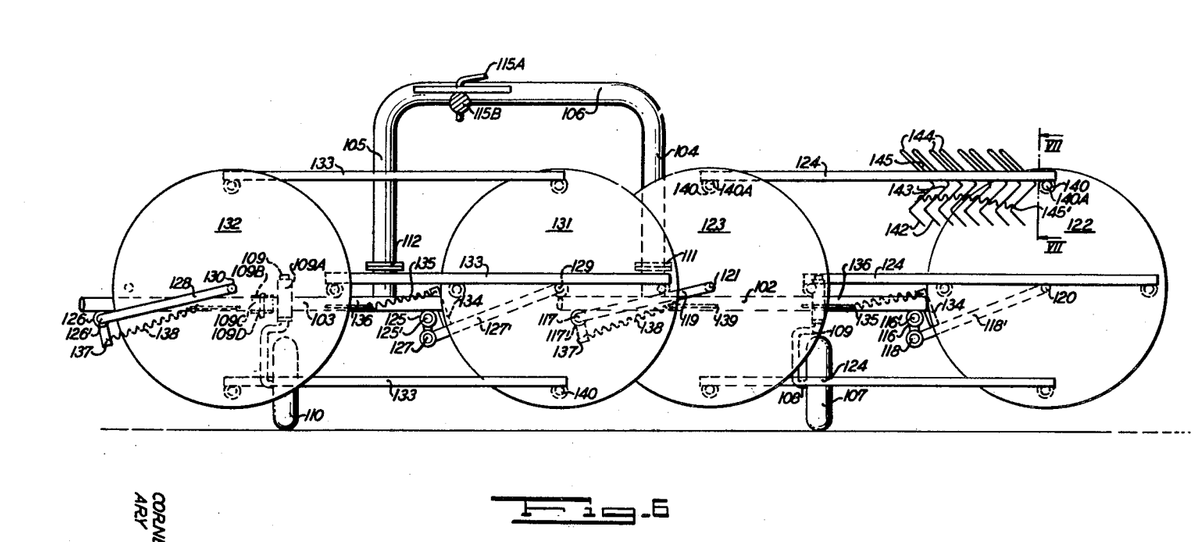
FIGURE 6 is a side elevation of the same device, viewed in the direction of the arrow VI in FIGURE 5.

A second embodiment of the device according to the invention is shown in FIGS. 5 and 6 and comprises a frame with two raking members, each consisting of parallel bars or beams mounted on rotors which are not driven by the motor of a tractor, but by the contact of the teeth with the ground and/or the material lying thereon, so that this device may be moved forward by a tractor or other suitable means, as desired.

The frame of the device is substantially composed of two girders 102 and 103 which are hingedly connected to the vertical limbs 104 and 105 of a bow 106. The girder 102 is supported by a running wheel 107 the horizontal axle 108 of which is connected to a vertical axle 109 which is rotatable in a bearing connected to the girder 102 in known manner. The axle 109 may be locked in any desired position. If the axle 109 remains unlocked, the running wheel 107 is self-adjusting. An example of an axle similar to axle 109 can be found in U.S. Patent 2,840,977. The girder 103 is supported by a running wheel 110 of the same construction as the running wheel 107.

The girders 102 and 103 can be locked in relation to the bow 106 (i.e. locked against rotational movement about the longitudinal axes of the limbs 104 and 105) in at least two suitable positions by means of locking members 111 and 112, respectively. More particularly the girders 102 and 103 may be locked in the position with regard to the bow 106 shown in FIGS. 5 and 6, in which the girders and the bow are situated in a single vertical plane. However, it is also possible to bring the bow 106 into the position 106A and the girder 102 into the position 102A parallel to the girder 103, and to lock the parts with regard to each other (see the dash-and-dotted lines in FIG. 5), whereby the raking device is transformed into a swath turner.

To the horizontal upper part of the bow 106 is connected one extremity of an arm 113 which is pivotably supported at 114 so as to be rotatable in relation to the bow about a vertical axis 114. Arm 113 supports a member adapted to engage semi-circular member 115 which is rigidly secured to the bow 106 to adjustably prevent movement between arm 113 and member 115 so that arm 113 may be locked in various positions with regard to bow 106. The free extremity of the adjustable arm 113 may be connected to a tractor or it may be provided with a self-adjusting wheel and a draw hook, by means of which the device is adapted to be drawn by an animal.

The girder 102 is provided at one end with a bearing 116 and at the other end with a bearing 117, carrying shafts 116′ and 117′ respectively. The shaft 116′ is one of the legs of a U-shaped link, the other leg 118 of which constitutes an axis of rotation for a crank 118′ with a crank pin 120. The shaft 117′ carries a crank 119 with a crank pin 121. Upon the crank pins 120 and 121 are respectively mounted for free rotation beam carrying supports 122 and 123. Said supports 122 and 123 are interconnected by four parallel bars or beams 124. The construction of the raking member formed by the beams and the supports therefor is substantially the same as that of the raking members in the device according to FIGS. 1–4, but in the present case the beam carrying supports are not directly driven by a motor, but they are set in rotation by the contact of the crop-engaging means on the lowermost beam with the ground and/or the material lying thereon.

The girder 103 is provided at one end with a bearing 125 and at the other end with a bearing 126, carrying shafts 125′ and 126′ respectively. The shaft 125′ is one of the legs of a U-shaped link, the other leg 127 of which constitutes an axis of rotation for a crank 127′ with a crank pin 129. The shaft 126′ carries a crank 128 with a crank pin 130. Upon the crank pins 129 and 130 are respectively mounted for free rotation beam carrying supports 131 and 132. Said supports are interconnected by four beams 133. The beams 133 and the beam carrying supports 131 and 132 form a raking member which is identical with the raking member already described. The cranks 118′ and 127′ are of the same shape and are both provided near their axis of rotation with an upstanding lug 134. Springs 135 are connected with one end to the upper end of said lugs, whereas the other ends of the springs are secured to the girder 102 or 103, respectively. To this end each of the girders is provided with a strip 136 having a series of holes into which the springs may be hooked with their outer ends. Upon the shafts 117′ and 126′ downwardly extending arms 137 are provided the lower ends of which are connected by springs 138 to two perforated strips 139, respectively secured to the girder 102 and to the girder 103. The tension of the springs 135 and 138 may be adjusted at will within certain limits and consequently the pressure of the crop-engaging means on the beams 124 and 133 against the ground may be varied. The suspension of the raking members on cranks permits the raking members to clear obstacles, without it being necessary for the whole frame to give way therefor.

In the position shown in FIG. 5, in which the girders 102 and 103 are in alignment, and supposing that the device is drawn forward in the direction of the arrow R by means of the arm 113, the running wheel 107 is fixed in the position indicated and the running wheel 110 is left self-adjusting, the material lying on the ground, which is worked by the beams 133 to the left, will be delivered still farther to the left by the beams 124. If, however, the girder 102 is brought into the position 102A and the arm 113 into the position 113A, the wheel 110 and the wheel 107A being fixed in the positions indicated in FIG. 5 and the device being drawn forward at the free extremity of the arm 113A in the direction of the arrow R, the two raking members will act independently of each other and the device will serve as a swath turner. The reference numerals of the cranks and the beam carrying supports, which have been displaced, are provided in FIG. 5 with the letter A in the displaced position.

The beams 124 and 133 are identical. For the sake of simplicity only a few teeth and their attachment have been indicated in FIG. 6 for one beam, viz. for the beam 124 that is in the highest position. This beam carries at each extremity a bushing 140, in each of which is mounted a pin fixed to a beam carrying support. The center lines of said bushings are parallel and horizontal. The mounting of a beam on the beam carrying supports and the arrangement of the pins on said supports are the same as in the device according to FIGS. 1–4. The position of the beam 133 in relation to the bushings differs, however, from the position in the device according to FIGS. 1–4, because according to FIG. 7 in this case the angle iron 141, 141A which interconnects the bushings 140, has an upstanding flange 141 that is not vertical but is forwardly inclined by a small angle. Although the construction and attachment of the teeth are in principle the same as in the device according to FIGS. 1–4, there is a difference that clearly appears from FIG. 7. The teeth 142 are located in a vertical plane, the supporting members 143 of these teeth lying in a plane which is backwardly inclined, while the U-shaped torsion bars 144 which afford at the same time the axes of rotation for the supporting members, are situated in the plane of the flange 141. This arrangement is not symmetrical, which is, however, no drawback, since in this device, contrary to that according to FIGS. 1–4, the rear sides of the parallel beams do not have to displace material here. Consequently the position of the teeth can be chosen as favorably as possible for delivery of material to the left, viewed in the direction of travel.

Figure 7:
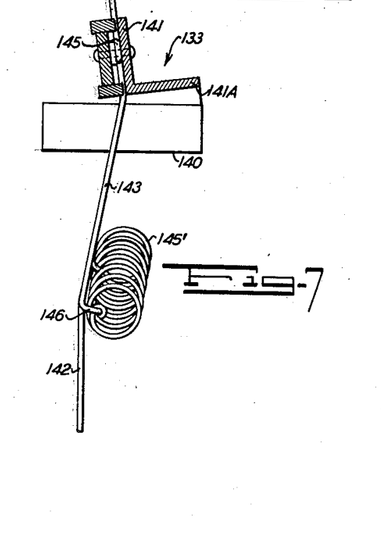
FIGURE 7 shows an enlarged sectional view of the raking beam of the device taken on line VII—VII of FIG. 6.

In order to allow the teeth and their supporting members to form together a wall in which large gaps are avoided as much as possible without interfering with the individual freedom of deflection of the teeth, the supporting members associated with the same roller beam are interconnected by a helical spring 145′. The fixing of the helical spring 145′ is effected by forming in each of the supporting members 144 of the teeth 143 a substantially closed loop 146 which engages the helical spring 145′. At the end teeth the helical spring is looped to engage the end supporting members and the end teeth. Only for the teeth near the end of a roller beam the place of the loop is somewhat different, viz. in such a manner that near the ends of a roller beam the distance of the loop to the flange 141A gradually increases and is approximately doubled at the end. The spring 145′ passes through the loops 146 in such a manner that between each two consecutive loops a predetermined small number of windings of the springs 145′ is located. Great differences in the deflection of a tooth with regard to adjacent teeth are counteracted by the parts of the spring 145′ situated on the left and on the right hand side of the tooth in question. For a tooth situated at the end of a beam the counteraction of one of said parts of the spring fails, since this part is not available or is very short. However, this is neutralized by the greater length of the arm on which the active part of the spring 145' acts on the support in question.

Figure 8:
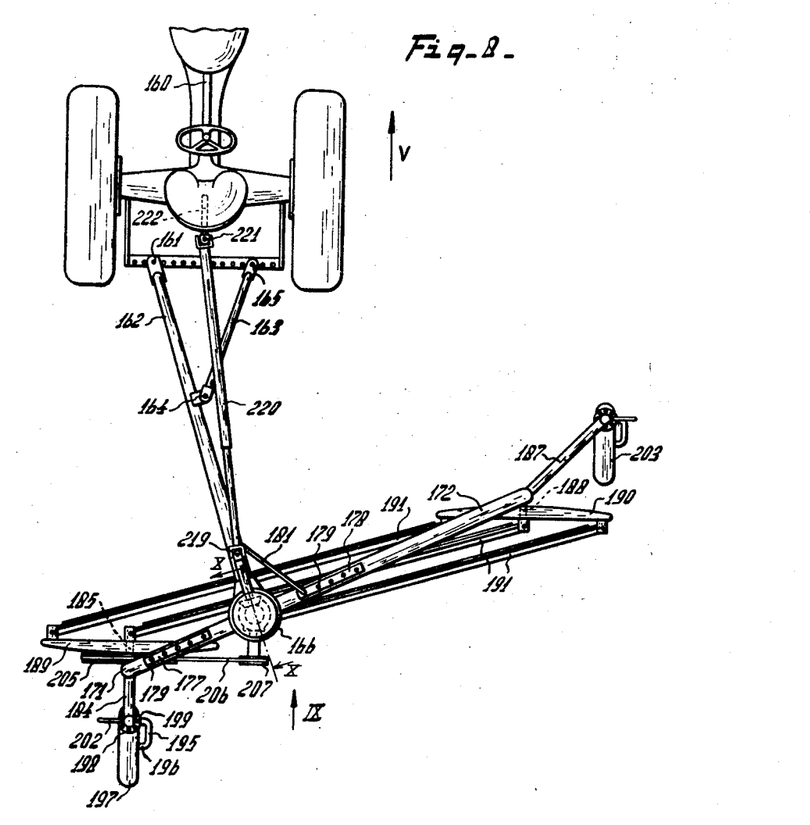
FIGURE 8 is a plan view of another embodiment of the device according to the invention.
Figure 9:
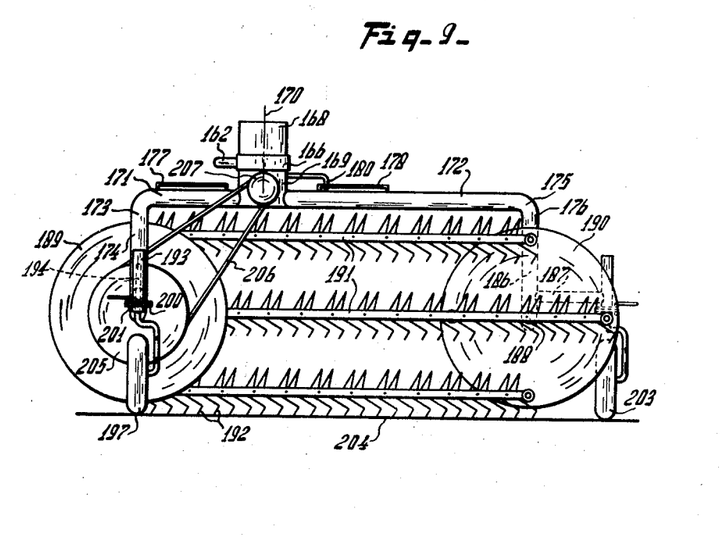
FIGURE 9 shows this device in elevation viewed in the direction of the arrow IX in FIGURE 8.

According to FIGS. 8 and 9 at a point 161 of a tractor 160 is secured one end of a draw arm 162. A bracing bar 163 is connected at 164 to the draw arm 162 and at 165 to the tractor. The other end of the draw arm 162 carries a horizontal ring 166 (see also FIG. 10) which is fixed by means of bolts 167 to a cup 168. A second cup 169 has a collar 270 accommodated between an edge 271 of the ring 166 and the lower edge 272 of the cup 168, so that the cup 169 and the cup 168 can only rotate with regard to each other about a vertical axis 170. Connected to the cup 169 are two aligned horizontal tubes 171 and 172. The tube 171 is downwardly bent at 173 into a vertical tube 174 and the tube 172 is downwardly bent at 175 into a vertical tube 176. The tubes 171 and 172 are provided on the upper side respectively with a strip 177 and 178. These strips are each provided with a number of holes 179. Through one of these holes passes the downwardly bent extremity 180 of a bracing bar 181; the other extremity of said bar 181 is secured to the draw arm 162 by means of a pin 182 passing through a hole in the bar (see FIG. 10). At 183 a horizontal arm 184 is fixed to the tube 174 and the lower end of the tube 174 is bent to form a horizontal shaft 185. In the same manner, to the tube 176 is fixed at 186 a horizontal arm 187, and the lower end of the tube 176 is bent to form a horizontal shaft 188. Upon the shafts 185 and 188 beam carrying supports 189 and 190 are rotatably mounted. Said supports carry together four beams 191 which are each provided with teeth 192. The horizontal arm 184 carries at its free end a vertical hollow bar 193 constituting a bearing for a vertical axle 194 rigidly connected by means of an arm 195 to the horizontal axle 196 of a running wheel 197.

The bar 193 carries at its lower end a ring 199 provided with holes 198. Against the under side of the ring 199 bears a ring 200 fixed to the axle 194 and provided with a hole 201. A locking pin 202 can pass through a hole 198 and the hole 201 in order to lock the axle 196 with regard to the frame formed by the tubes 174, 171, 172 and 176. The horizontal arm 187 is provided with a running wheel 203 in exactly the same manner. The running wheels 197 and 203 rest upon the ground 204 and support the device in such a manner that the teeth 192 of a beam 191 in its lowermost position will slightly touch the ground.

Rigidly fixed to the beam carrying support 189 is a rope pulley 205, so that both members can rotate jointly about the shaft 185. An endless rope or belt 206 couples the pulley 205 with a rope pulley 207. The latter is secured to a horizontal shaft 208 which is mounted in a bearing 209 integral with the cup 169 and carries within said cup a bevel gear wheel 210.

Within the cups 168 and 169 are formed bearings 211 and 212 for the ends of a vertical shaft 213 carrying two bevel gear wheels 214 and 215. The lowermost wheel 215 meshes with the gear wheel 210 and the wheel 214 meshes with a bevel gear wheel 216 fixed upon a shaft 217. The shaft 217 is mounted in a bushing 218 which is integral with the cup 168. Outside the cup 168 the shaft 217 is connected by means of a universal joint 219 to a telescopic shaft 220 which is coupled by means of a second universal joint 221 with the power take-off 222 of the tractor 160.

The device is used as follows: The tractor 160 is driven in the direction of the arrow V over the land; thereby the running wheels 197 and 203 may or may not be locked in the position shown in FIG. 8 by means of the locking pins, such as the pin 202. The power take-off 222 drives the shafts 220 and 217, so that through the gear wheels 216 and 214 the shaft 213 will rotate. Through the gear wheels 215 and 210 the shaft 213 drives the shaft 208 with the pulley 207. Through the rope 206 the pulley 205 and the beam carrying support 189 will revolve.

The beams 191 act as coupling rods, by which the beam carrying support 190 will also revolve. The power take-off shaft rotates in such direction that always the lowermost of the beams 191 will move to the left. The device then operates as a rake delivering to the left. However, it is also possible to rotate the power take-off shaft in the opposite direction, in which case the device operates as a tedder.

Figure 11:
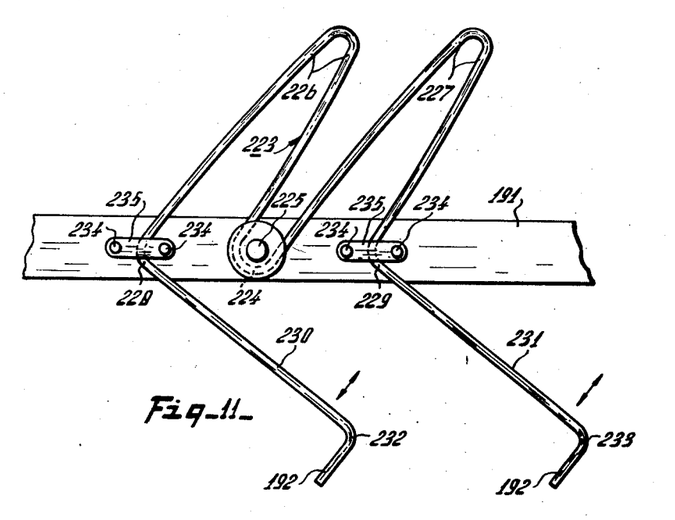
FIGURE 11 is a side elevation on a larger scale of the teeth and their attachment in said device.

In order to ensure that the teeth will exactly follow the ground upon movement in the one or in the other direction, the teeth 192 are fixed to the beams 191 in the manner shown in FIG. 11.

Every pair of teeth 192 is formed by the extremities of a steel wire 223, the double-bent middle 224 of which is clamped to the beam 191 by means of a bolt 225. The parts 226 and 227 of the wire adjacent to the middle 224 are bent in U-shape. The remaining ends of the wire 223 are bent at right angles at 228 and 229 and constitute supporting members 230 and 231, said members being bent at right angles at 232 and 233 to form a pair of teeth 192. The parts of the steel wire 223 at 228 and 229 are each located with clearance between two pins 234 and at the same time with a small clearance between the beam 191 and a strip 235 which is held at a distance from the beam 191 by the pins 234. All parts of the steel wire 223 are located in a vertical plane. The advantage of this construction is that the raking action of the teeth is equally favorable in both directions. Moreover the teeth 192 are able to move upwards in the plane of the wire 223 and all parts of the wire can bend in said plane without being obstructed by the pins 234.

By reversing the direction of rotation of the power take-off shaft the device will operate as a tedder.

In many cases this reversal would necessitate special precautions at the tractor. In the device shown in FIGS. 8–10 there is, however, a possibility which is preferred to the reversal of the direction of rotation of the power take-off shaft. The frame with the tubes 171 and 172 and the supports 189 and 190 may be rotated half a turn about the axis 170, as the result of which the device takes up the position shown in FIG. 12, wherein the parts which have changed their place have been indicated by the same reference numerals as in FIGS. 8–10, with the addition of the letter A. Without changing the direction of rotation of the power take-off shaft, the beams 191A will now move to the right in their lowermost position, so that the device operates as a tedder. The advantage is obtained that the arrangement of the teeth does not have to be symmetrical with regard to a vertical plane parallel to the beam in question, since the teeth always act in the same direction. Thus, an asymmetrical arrangement of the teeth may be adopted.

Figure 12:
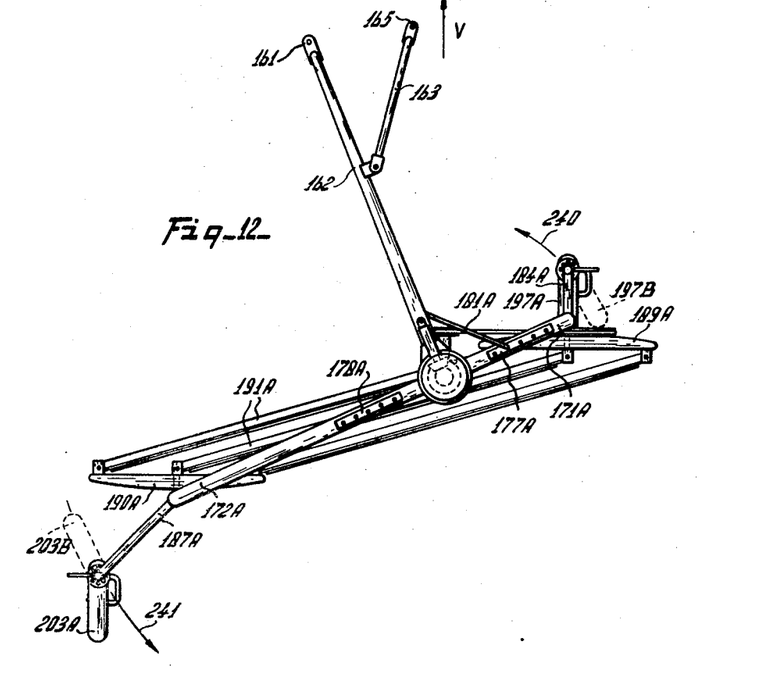
FIGURE 12 shows the device according to FIGURES 8 to 11 in plan view and in a modified position in which the device works as a tedder.

The transformation of the device from the position according to FIG. 8 into the position according to FIG. 12 is effected in the simplest manner by locking the running wheels with regard to the frame temporarily in the position 203B and 197B by means of the locking pins, such as the pin 202. In this position the extensions of the axes of the wheel axles intersect the vertical axis 170 of the draw arm, so that, when the bar 181 has been disengaged, the frame can be easily turned about the axis 171, while the running wheels roll over the ground in the direction of the axes 240 and 241. In the new position the running wheels are again made self-adjusting or locked in a suitable position and the bar 181 is also fixed.

Figure 13:
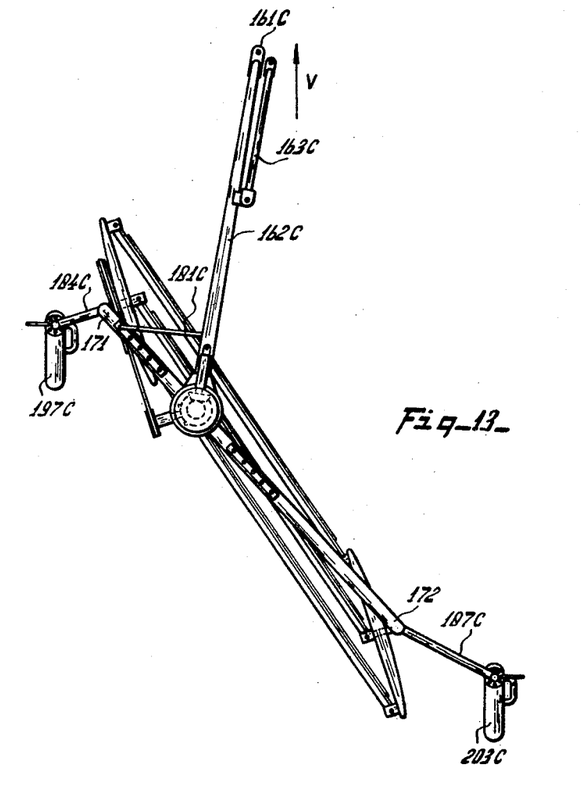
FIGURE 13 is a plan view of the device according to FIGURES 8 to 11 position in which the device can be easily transported.

When the device is to be transported, a large width could be disadvantageous. To avoid this the device can be brought to the position shown in FIG. 13. In this position the parts in question of the device have been indicated by the same reference numerals as in FIG. 8, but the letter C has been added. Preferably the running wheel 203C is locked in the illustrated position, whereas

What we claim is:

1. A device for laterally displacing material on the ground comprising support means adapted for rotation, a raking beam connected to the support means and movable therewith to describe a path of movement and raking means supported on the raking beam and including a tooth having an end describing a path in interference with the ground along a portion of the path of the raking beam, said raking means further comprising means supporting said tooth from the raking beam and including a torsion bar, said torsion bar and tooth initially lying in a common plane, said torsion bar being secured to said raking beam and extending therefrom to secure the tooth for elastic rotation about an axis inclined with respect to the raking beam as the tooth contacts the ground, said torsion bar being elastically and torsionally deformed during rotation of said tooth relative to said beam and restoring the tooth to the original position thereof as the beam describes the portion of the path in which the tooth is free of the ground.

2. A device as claimed in claim 1 wherein said axis about which said tooth is turnable is inclined to the vertical.

3. A device as claimed in claim 1 wherein said tooth extends substantially parallel to the axis about which it is rotatable.

4. A device as claimed in claim 1 comprising a plurality of teeth on said raking beam and including the first said tooth, and a resilient coupling member extending substantially in the same direction as the raking beam coupling said plurality of teeth together.

5. A device as claimed in claim 4, wherein the coupling member comprises a helical spring, each tooth having a loop associated therewith for accommodating said spring.

6. A device as claimed in claim 1 wherein the device is arranged for teddering when the beam is driven in a direction opposite to that for a raking action.

7. A device as claimed in claim 1 comprising frame portions, each of which carries a raking member, an intermediate coupling member, said portions being hingedly connected to said intermediate coupling member which permits adjustment of said portions with respect to the coupling member about substantially vertical axes, whereby the frame portions can be locked selectively in alignment and in parallel relation to each other.

8. A device as claimed in claim 7, wherein the coupling member includes an arm which is adjustable relatively thereto in a substantially horizontal plane and which may be locked in various angular positions relative to said coupling member.

9. A device as claimed in claim 1 wherein the support means includes a frame, rotatable supports for the raking beam, and a crank, at least one of the rotatable supports of the raking beam being mounted on said crank, said crank having axes parallel to each other, said crank being rotatably supported in the frame.

10. A device as claimed in claim 9, comprising a plurality of raking beams including the first said beam and a link for each beam, one of the cranks associated with the two rotatable supports of a raking beam being connected to the beam through the intermediary of said link.

11. A device as claimed in claim 4 wherein said teeth include supporting arms and said coupling member is coupled to the supporting arms of each of the teeth.

12. A device as claimed in claim 1 wherein said means supporting said tooth includes a supporting arm having opposite ends, said torsion bar being coupled to said tooth via said supporting arm, said tooth being supported from one of the ends of said supporting arm, the other of said ends of said supporting arm being attached to said torsion bar, the tooth and supporting arm together constituting a single piece of metal wire.

13. A device as claimed in claim 12 wherein said torsion bar is an integral extension of said supporting arm.

14. A device as claimed in claim 1 wherein said tooth and said torsion rod are situated in a common vertical plane.

15. A device as claimed in claim 13 comprising bearing means on said raking beam, said extension being guided for turnable movement about its own axis by said bearing means.

16. A device as claimed in claim 13 wherein said extension is of U-shape and has an end remote from the supporting arm which is rigidly attached to the raking beam.

17. A device as claimed in claim 12 wherein said supporting arm is capable of yielding torsionally.

References Cited in the file of this patent
UNITED STATES PATENTS

| | | |
|---|---|---|
| 2,482,883 | Thomas | Sept. 27, 1949 |
| 2,514,699 | Hiatt | July 11, 1950 |
| 2,641,101 | Redrow | June 9, 1953 |
| 2,667,027 | Hauswirth | Jan. 26, 1954 |
| 2,672,005 | Hamilton | Mar. 16, 1954 |